United States Patent
Smith

(10) Patent No.: US 7,946,797 B2
(45) Date of Patent: May 24, 2011

(54) EGG TRANSPORT MODULE

(75) Inventor: Colin James Smith, Beerwah (AU)

(73) Assignee: Christine Anne Smith, Queensland (AU), 50% interest ( * ) Notice: Subject to any disclaimer, the term of this patent is extended or adjusted under 35 U.S.C. 154(b) by 75 days.

(21) Appl. No.: 12/183,902

(22) Filed: Jul. 31, 2008

(65) Prior Publication Data

US 2009/0107801 A1    Apr. 30, 2009

Related U.S. Application Data

(63) Continuation-in-part of application No. PCT/AU2007/000114, filed on Feb. 6, 2007, and a continuation-in-part of application No. PCT/AU2007/000428, filed on Apr. 2, 2008.

(51) Int. Cl.
*B65G 1/00* (2006.01)
(52) U.S. Cl. .............. 414/331.09; 414/331.11; 198/435; 198/607
(58) Field of Classification Search .................. 198/435; 414/331.09, 331.11
See application file for complete search history.

(56) References Cited

U.S. PATENT DOCUMENTS

| | | | | |
|---|---|---|---|---|
| 746,247 A * | 12/1903 | Baggaley | ........................ | 198/435 |
| 2,160,319 A * | 5/1939 | Swartz | ........................ | 209/516 |
| 2,661,831 A * | 12/1953 | Kenney | ........................ | 198/435 |
| 3,272,307 A * | 9/1966 | Waite | ........................ | 198/435 |
| 3,430,787 A * | 3/1969 | Hoffman et al. | ........... | 198/369.2 |
| 3,672,485 A * | 6/1972 | Walters | ........................ | 198/450 |
| 3,734,264 A * | 5/1973 | Stumpf | ........................ | 198/347.4 |
| 4,159,696 A * | 7/1979 | Martin | ........................ | 119/337 |
| 4,277,216 A * | 7/1981 | Lindberg | ................. | 414/331.09 |
| 4,416,219 A * | 11/1983 | Dill | ............................ | 119/337 |
| 5,007,785 A * | 4/1991 | van der Schoot | ........ | 414/331.11 |
| 5,009,303 A * | 4/1991 | Lutzke | ........................ | 198/347.3 |
| 5,562,067 A * | 10/1996 | Smith | ........................ | 119/334 |
| 5,673,649 A * | 10/1997 | Duecker et al. | ............... | 119/337 |
| 6,227,377 B1 * | 5/2001 | Bonnet | ........................ | 209/650 |
| 6,732,851 B2 * | 5/2004 | Wienken | .................... | 198/459.6 |
| 7,573,567 B2 * | 8/2009 | Hershtik | ........................ | 356/54 |
| 7,585,143 B2 * | 9/2009 | Hanaoka | ................. | 414/331.02 |

* cited by examiner

*Primary Examiner* — Joe Dillon, Jr.
(74) *Attorney, Agent, or Firm* — William H. Eilberg

(57) ABSTRACT

An egg transport system has an egg transport module (10) where eggs are stored on a plurality of shelves (20) on a transportable frame (30) with wheels (11).
The module (10) is loaded or unloaded by a loader (50, 150) and unloader (70), both of which can be vertical aligned to enable loading/unloading of a selected one of the shelves (20).

6 Claims, 10 Drawing Sheets

EGG TRANSPORT MODULE

BACKGROUND OF THE INVENTION

1. Field of the Invention

THIS INVENTION relates to an egg transport module for the transport of loose eggs between different locations.

The invention also relates to an egg loader for loading eggs onto the transport module; an egg unloader for receiving eggs from the transport module; and an egg transport system incorporating the transport modules, egg loader and egg unloader.

2. Prior Art

Within the poultry industry today, excepting battery production, there is an increasing move away from the hand gathering of eggs towards automated egg collection. This means that the eggs are automatically removed from the laying nests and conveyed to the front of the sheds for packing. Examples of egg harvesters suitable for such automated egg collection are disclosed in International Publication WO 92/20222 (=U.S. Pat. No. 5,562,067) (Smith) and International Publication WO 02/091819 (Smith).

Packing is usually performed by manual labour, standing at a packing table and sorting, and positioning, the eggs into trays, ready for removal from the sheds.

In limited instances, the eggs are conveyed beyond the shed(s)—sometimes more than 100 meters—by a specialised "anaconda"-type conveyor system, to a central grading area, where they are mechanically graded and packed onto trays by automated farm packer machines. This provides an almost totally automated system with minimal labour requirements. These conveyors have only been partly accepted by the industry, as an option to manual packing and moving. There are numerous reasons for this:

1) these systems are expensive over long distances;
2) the conveyors are obtrusive in layout to key access areas on farms and/or;
3) the eggs can be exposed to severe temperatures during the slow journey to the packing area, which is totally unacceptable to both commercial table eggs and the more valuable fertile breeder eggs.

SUMMARY OF THE PRESENT INVENTION

It is an object of the present invention to provide an egg transport module which provides an effective means for collecting, storage and/or transport of loose eggs, eg., from an automated egg collection system to a central grading/packing area.

It is a preferred object to provide such transport modules where the modules are refrigerated to ensure the eggs are safely stored during the collection/storage/transport modules.

It is a further preferred object to provide such transport modules which are easily transported, over even large distances, where the size of the modules is designed around standard trucking dimensions.

It is a still further preferred object of the present invention to provide such transport modules which are fitted with antivibration cushioning devices for transport, and where the shelves are oriented to nest the eggs together, thus minimising cracking, when in the transport mode.

It is a still further preferred object of the present invention to provide an egg loader suitable for use with the transport modules.

It is a still further preferred object of the present invention to provide an egg unloader to unload the eggs from the transport modules.

It is a still further preferred object to provide an egg transport system incorporating the transport modules, egg loader and egg unloader.

In one aspect, the present invention resides in an egg transport module including:

a main frame;

a plurality of vertically-spaced shelves supported by the main frame, each shelf having an egg entry end;

a respective movable belt or mat on each shelf, operable to move the eggs to and/or from the egg entry end to at least one storage zone on the shelf; and respective drive means to operably move each belt or mat.

Preferably, the main frame is rectangular (eg., square) in plan view with external dimensions which do not exceed standard trucking dimensions, eg., for length, width or height.

Preferably, the main frame has a base frame with four posts (preferably at or adjacent the respective corners) which support a top frame.

Preferably, the base frame is supported on wheels (eg., castor wheels), and may incorporate slots to receive the forks of forklifts or other materials handling vehicles. The wheels may be retractable, to allow the base frame to rest on antivibration pads or blocks during transport.

Each shelf may be upwardly inclined, eg., at less than 10°, more preferably less than 5°, from the egg entry end, to prevent eggs rolling ahead and cracking during filling; and is preferably provided with stop means at a distal end thereof.

In one preferred embodiment, each shelf comprises a plurality of panels, hingedly connected together transversely to the longitudinal axis of the shelves.

Preferably, the ends of adjacent panels are supported in base support channels and are retained by pin(s).

Preferably, at least one set of vertically aligned base support channels are mounted on a pair of post slides, slidably mounted on intermediate post interconnecting the base frame and the top frame, to enable the shelves to be selectively moved to form at least one substantially shallow V-shape storage zone, to nest the eggs together when the module is being transported.

In a second embodiment, each shelf has a single panel of modified V-section in end view.

Preferably, the panels comprise welded mesh panels, which are overlaid with stationery secondary panels of plastic (or metal), which are positioned between the panels and the band or mat, to prevent egg leakage through to lower shelves.

Preferably, each band or mat is perforated to allow air flow through to the eggs and to allow drainage if a broken egg occurs.

The band or mat may be manufactured from rubber and/or plastic sheet or metal (eg., steel or aluminium) or plastics rods or mesh.

Preferably, each band or mat passes around a head roller, at or adjacent the entry end for the shelf and a tail roller, adjacent the distal end of the shelf. Preferably, the tail roller is rotatably journalled in spring-mounted supports which enable a pre-set tension to be maintained in the band or mat.

Preferably, the head roller is operably connected to a driven gear which is engaged by a driving gear on an egg loader, when eggs are being transferred to the shelf, and by a similar driven gear on the egg unloader when the eggs are to be unloaded from the shelf.

Preferably, the modules are provided with side and end thermally-insulated curtains, doors and/or walls; and preferably, a refrigeration unit is mounted (preferably on the top frame) to provide cooling air to maintain the eggs within a preferred temperature range while stored on the transport modules.

In a second aspect, the present invention resides in an egg loader, suitable for use with the egg transport module hereinbefore described, the egg loader including:

a docking station having an external frame;

a loading head movable vertically up and down the external frame to access different shelf levels on the transport module when located at the docking station;

a platform conveyor on the loading head having a discharge end arranged to be located adjacent the egg entry end of a selected shelf of the transport module located at the docking station and an inlet end spaced therefrom;

a connecting conveyor operable to transfer eggs from a collection station to the inlet end of the platform conveyor; and drive means for the platform conveyor; so arranged that:

eggs are transportable from a collection station along the connecting conveyor and the platform conveyor to the egg entry ends of the selected shelves on the transport module.

Preferably, the drive means for the platform conveyor incorporates a driving gear operable to engage a driven gear of the respective shelf of the transport module with which it is adjacent.

Preferably, the platform conveyor is mounted on a horizontal support frame on the loading head, to enable retraction away from the transport module when the loading head is moved vertically for selective alignment of the platform conveyor with the shelves of the transport module.

Preferably, a connecting bridge is provided between the platform conveyor and the adjacent shelf in the transport module, the bridge being raised when the platform conveyor is retracted to prevent eggs rolling forward from the platform conveyor.

Preferably, in one embodiment, a convergent chute is provided on the platform conveyor, and is hingedly mounted to "sweep" transversely across the platform conveyor, to distribute the eggs evenly across the entire width of the platform conveyor, to enable the maximum number of eggs to be conveyed to each shelf of the transport module.

In an alternative embodiment, the platform conveyor includes: an accumulating conveyor having an inlet end adjacent the connecting conveyor;

an egg roller extending parallel to an egg entry end of a selected shelf of the transport module; and a transfer conveyor between the accumulating conveyor and the egg roller, and operable to transfer eggs from the accumulating conveyor to the egg roller.

Preferably, a first sensor detects partial accumulation of eggs on the transfer conveyor to selectively shut off the transfer conveyor until a second sensor detects a full accumulation of the eggs on the transfer conveyor, the second sensor also operating the egg roller to transfer the eggs to the selected shelf by operation of the egg roller.

Preferably, the connecting conveyor is hingedly mounted between the collection station and the inlet end of the platform conveyor; and preferably, the connecting conveyor is telescopically extendable to facilitate the vertical movement of the loading head to different levels in the docking station.

Preferably, the connecting conveyor has transverse rods or bars to prevent the eggs rolling down the inclined top run of the connecting conveyor.

In a third aspect, the present invention resides in an egg module unloader including:

a conveyor to receive eggs from the egg entry end of the respective shelves of the transport module and a connecting conveyor conveys the eggs to a packing and/or grading station (or the like).

Other preferred features of the present invention will become apparent from the following description.

BRIEF DESCRIPTION OF THE DRAWINGS

To enable the invention to be fully understood, a preferred embodiment will now be described with reference to the accompanying drawings in which.

DETAILED DESCRIPTION OF THE PREFERRED EMBODIMENTS

Figure 1:
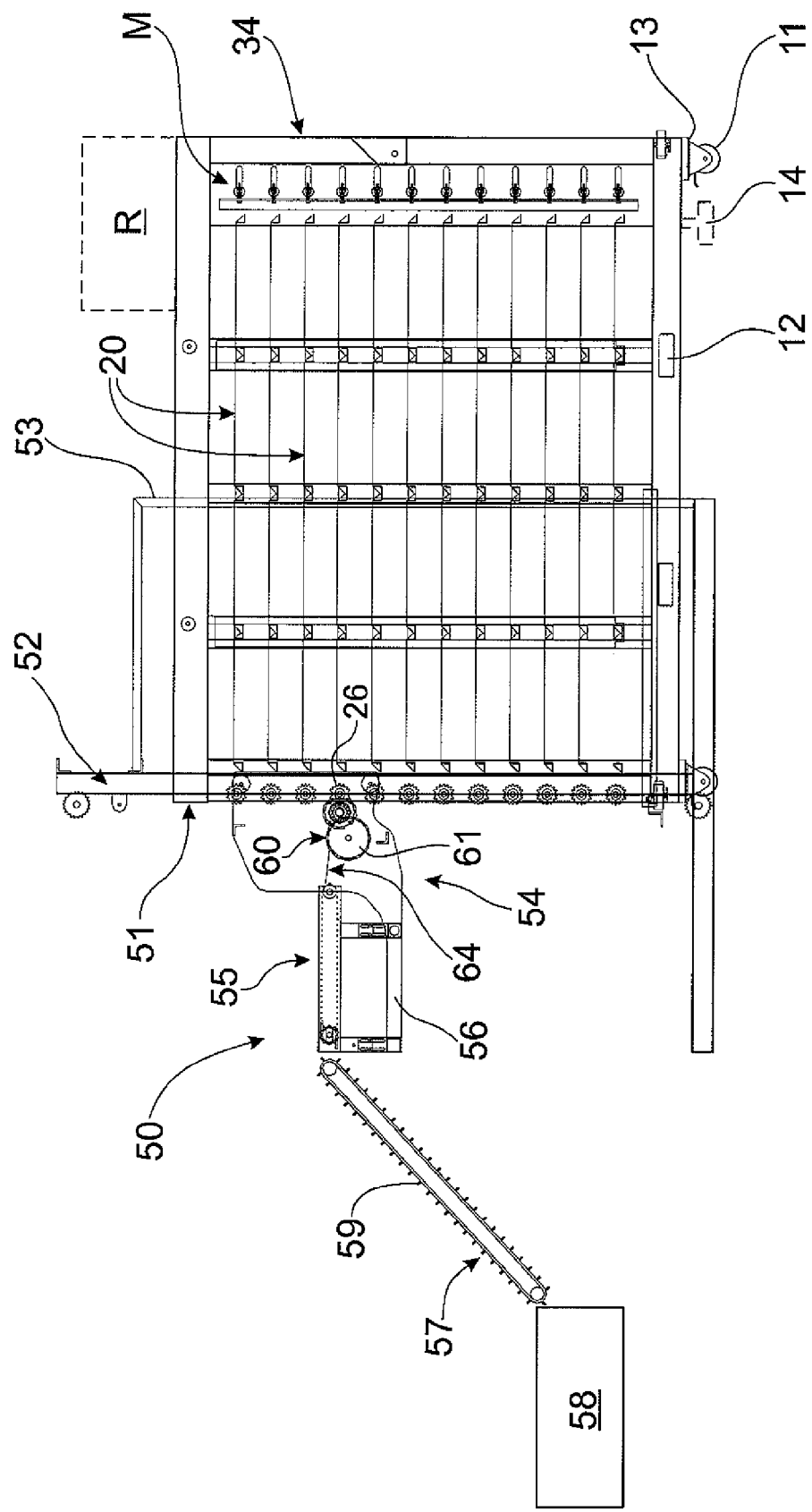
FIG. 1 is a schematic sectional side view of a first embodiment of the egg transport module, and a first embodiment of the egg loader.
Figure 2:
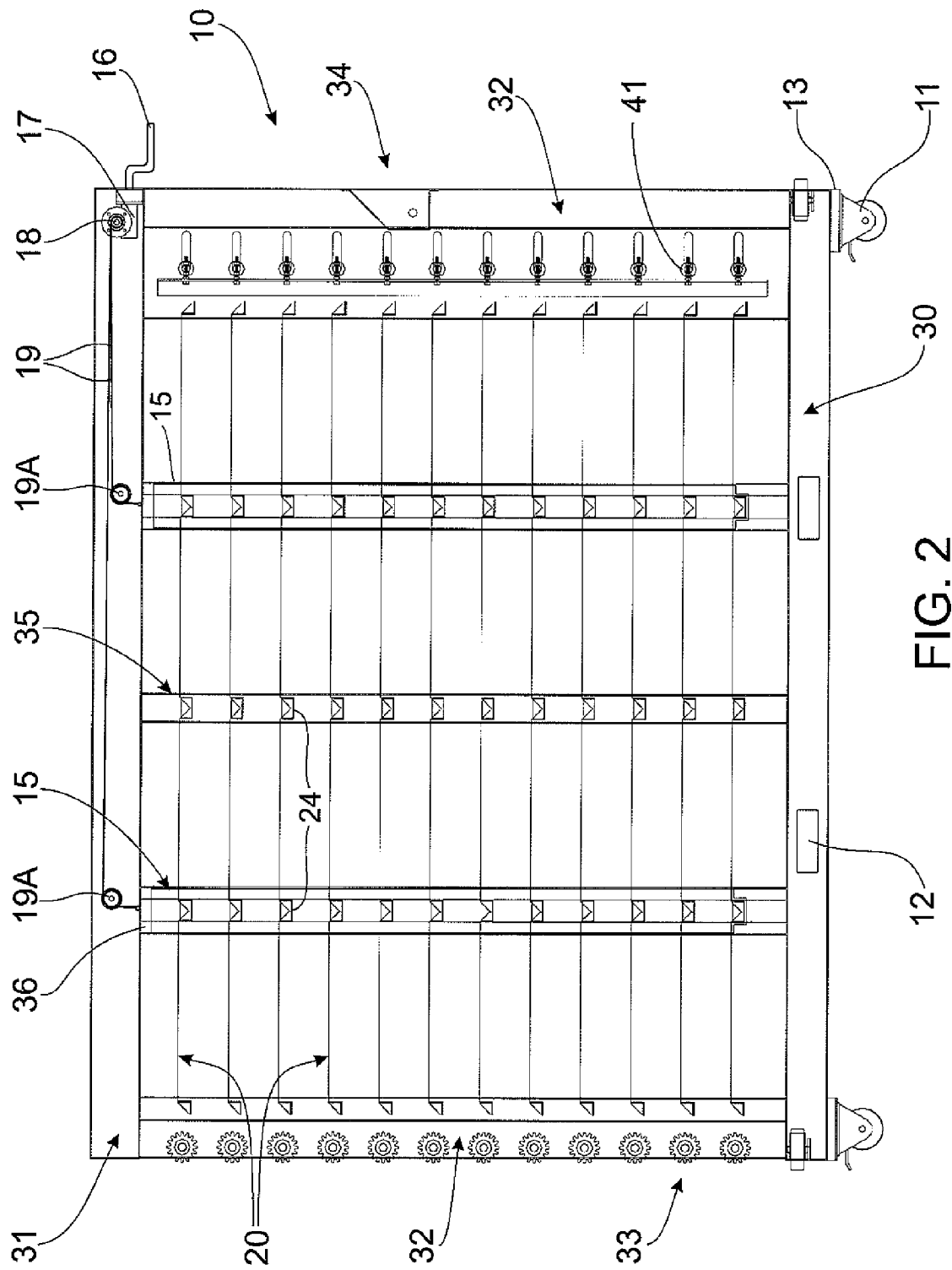
FIG. 2 is a sectional side view of the module, in the filling mode.
Figure 3:
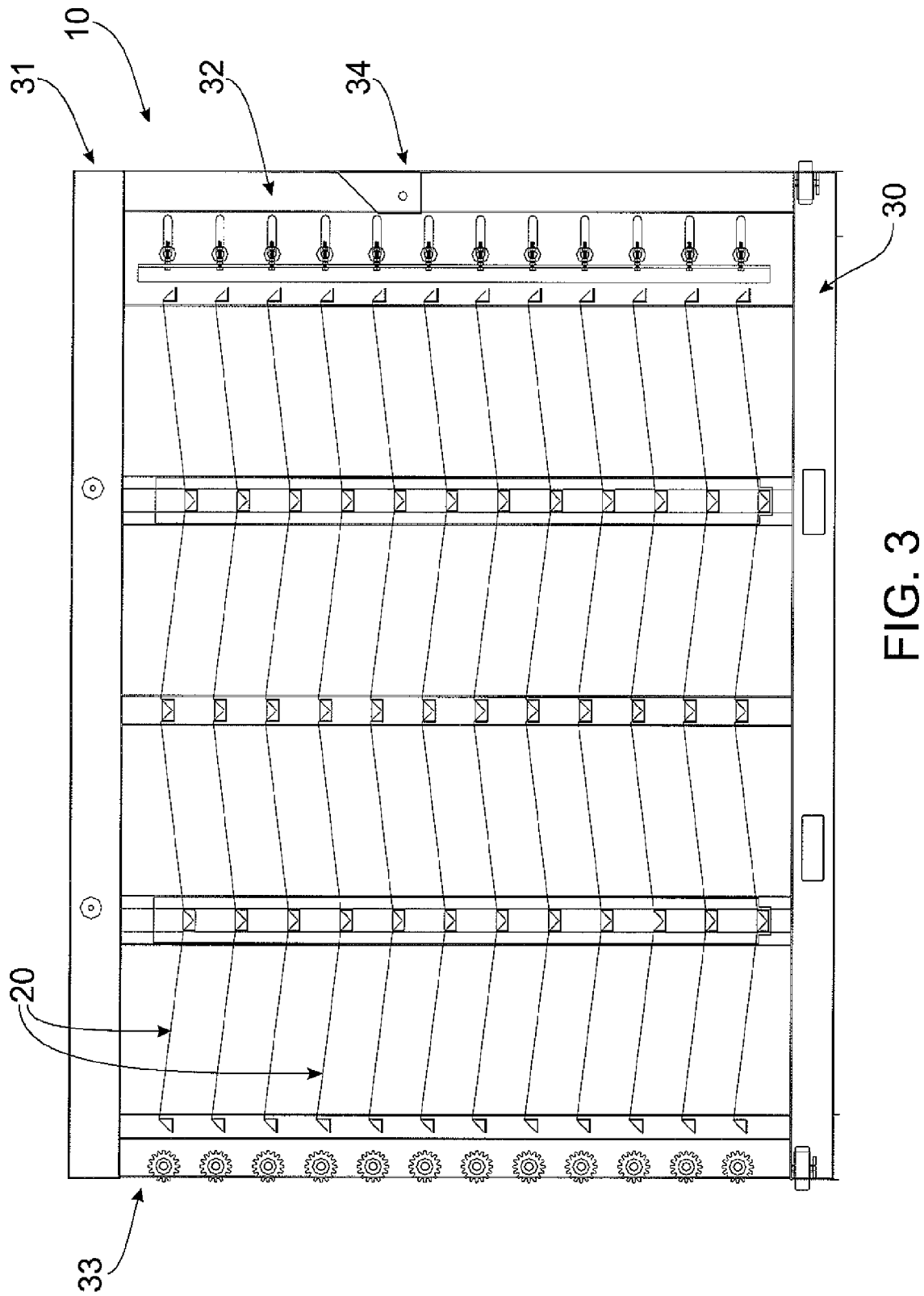
FIG. 3 is a similar view of the module, in the transport mode.

Referring to FIGS. 1 to 3, the egg transport module 10 is rectangular in plan view and is preferably of sufficient size to accommodate a full day of production from a single shed. The size is partly determined by transport requirements, preferably not exceeding standard length/width/height limits for transportable containers and preferably has a floor area equaling a multiple of standard pallet sizes.

The transport module 10 has a base frame 30 and a top frame 31 interconnected by corner posts 32.

The base frame 30 is provided with castor-type wheels 11 for ease of movement, as well as the provision of slots 12, to enable engagement of the forks of forklifts or other materials handling vehicles for safe transport. The wheels 11 are mounted on anti-vibration mounts 13 to assist against cracking the eggs contained in the transport module; and retraction of the wheels 11 allows the module 10 to rest on anti-vibration pads 14, on the base frame 30, when the transport module 10 is in the transport mode.

Vertically-spaced shelves 20 are upwardly-inclined, eg., at less than 5°, from an egg entry end 33 of the transport module 10 to a distal unloading end 34 where the shelves 20 are provided with stops (not shown) which prevent the eggs from passing over the distal ends 34 of the shelves 20.

Figure 4:
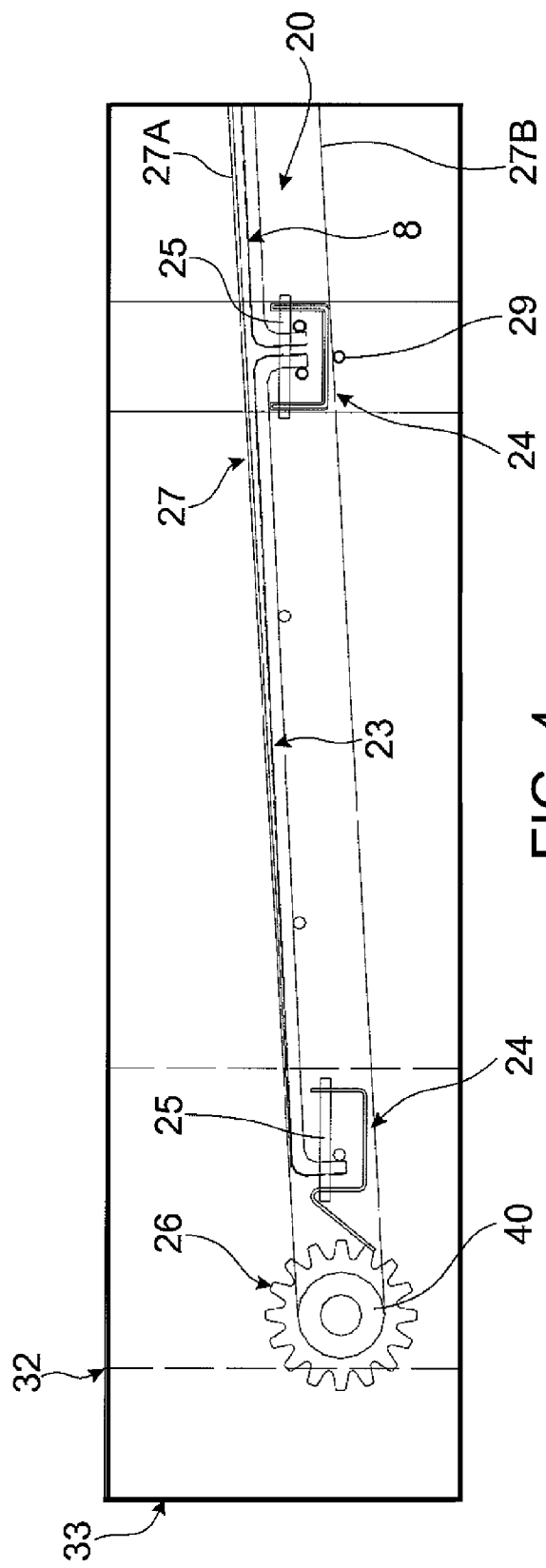
FIG. 4 is a similar view, on an enlarged scale, of the front section of one shelf of the transport module.
Figure 5:
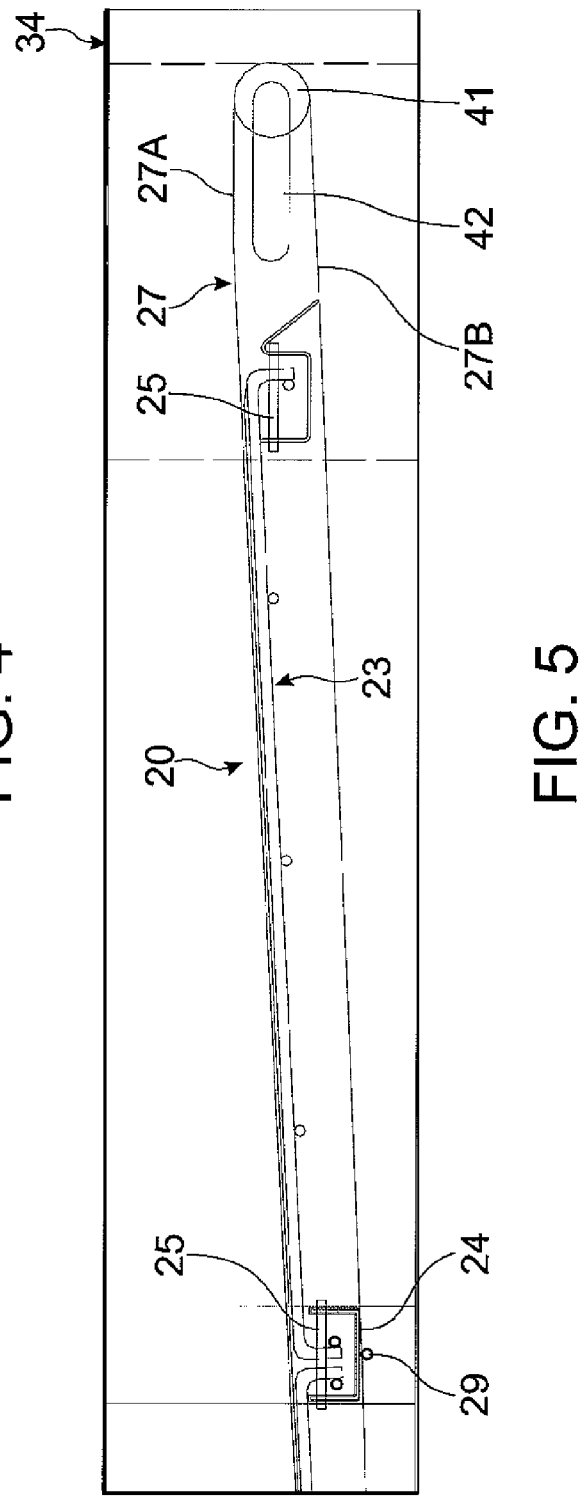
FIG. 5 is a similar view of the back section of one shelf.

As shown in more detail in FIGS. 4 and 5, the shelves 20 each comprise four welded mesh panels 23, carried between respective base support channels 24 and retained therein by pins 25. The top runs 27A of continuous belts or mats 27 are supported by stationary plastic panels 28, interposed between the upper runs 27A of the mats 27 and the welded mesh panels 23, to prevent egg leakage through to lower shelf levels.

The mats 27 are perforated to allow air flow through to the eggs and to allow drainage if a broken egg occurs, and may be designed from rubber or plastic sheet or metal, eg., steel, or plastic rods or mesh.

The mats 27 pass around a head roller 40 which is connected through to a driven gear 26 (for the purpose to be hereinafter described); and around a tail roller 41, which is provided with axles (not shown) received in slots 42 and urged towards the distal ends 34 of the shelves 20 by compression springs or blocks (also not shown) to maintain a desired tension on the mats 27. The lower runs 27B of the mats 27 are supported by spaced transverse rods or bars 29 (preferably mounted below respective base support channels 24).

If necessary, the tail rollers 41 may be mounted on mechanical supports, movable, eg., in the horizontal plane, to provide sufficient travel to enable the tail rollers 41 to maintain the tension in the mats 27 as the shelves 20 are reconfigured between the filling and transport modes.

The front and rear base support channels 24, and the central base support channels 24, are fixed on the corner posts 32, and central side post 35, respectively.

The intermediate base support channels 24 are mounted on post slides 15, slidably mounted on intermediate posts 36 connecting the base frame 30 and top frame 31. A rotating handle 16 operates through a small gearbox 17 to rotate shaft 18. Attached to the shaft 18 are stainless steel cables 19, passing over pulleys 19A, and to the post slides 15 to enable the configuration of the shelves 20 to be changed from the substantially planar arrangement shown in the filling mode of FIGS. 1 and 2 to the substantially shallow W-shape (formed by two substantially shallow V-shapes), to cause the loose eggs to nest in the two lowermost portions of the shelves 20, in the transport mode shown in FIG. 3. (It will be noted that the tail rollers 41 move relative to the slots 42 to accommodate the effective increase in length in the shelves 20 in the transport mode.)

The respective driven gears 26 on the mats 27 of the shelves 20 are selectively engageable by a driving gear (to be hereinafter described) on the egg loader, or on the egg unloader, to enable the mats 27 to be moved to charge the shelves 20 with eggs or to discharge the eggs from the shelves 20, as required.

The transport module 10 is preferably enclosed with a curtain C on all sides, top and bottom, to provide an airtight fit. The covering may be of a heavy fabric insulated material on the four sides, possibly with VELCRO (trade mark) attachment; a metal floor; and a fibreglass, plastic or metal top wall. Alternatively, the side and end walls may be manufactured from insulated panels, with a respective opening door or panel at the egg entry end 33 and the egg unloading end 34, when the transport module 10 is engaged with the egg loader or egg loader, to be hereinafter described.

The transport module 10 is designed for high pressure washing and thorough cleaning, and preferably incorporates plastic bearings, a galvanised or powder-coated frame, stainless steel fittings and food-quality plastic or steel mats 27.

The transport module 10 is provided with a refrigeration unit 12, mounted on the top frame 31, to chill and maintain the eggs at a required temperature and cool air from the refrigeration unit R is delivered through a manifold M at the unloading end 34 of the module 12 of the shelves 2.

As hereinbefore described, the shelves 20 are upwardly-inclined, eg., at less than 5° from the egg entry end 33 to the unloading end 34, to prevent eggs rolling ahead and cracking during filling. A transverse stop member S extends across the top run of each mat 27 adjacent the head rollers 40, when the mat 27 has been advanced to completely fill the respective shelf 20 with eggs. The stop member prevents the eggs being inadvertently released from the shelf 20 when the loading head (to be hereinafter described) of the egg loader, or corresponding unloading head of the egg unloader, is moved out of alignment with the shelf 20.

In addition, sensors (not shown) at the stops adjacent the unloading end 34 will shut off the supply of eggs to the shelf 20 by the egg loader when the shelf 20 has become fully loaded.

Preferably, the egg entry end 33 of the transport module 10 and/or the adjacent docking station (to be hereinafter described) of the egg loader or egg unloader, will be provided with sealing means to provide a thermally-insulating seal between the transport module 10 and the egg loader or egg unloader when the transport module 10 is being filled with, or emptied of, the eggs.

Figure 8:
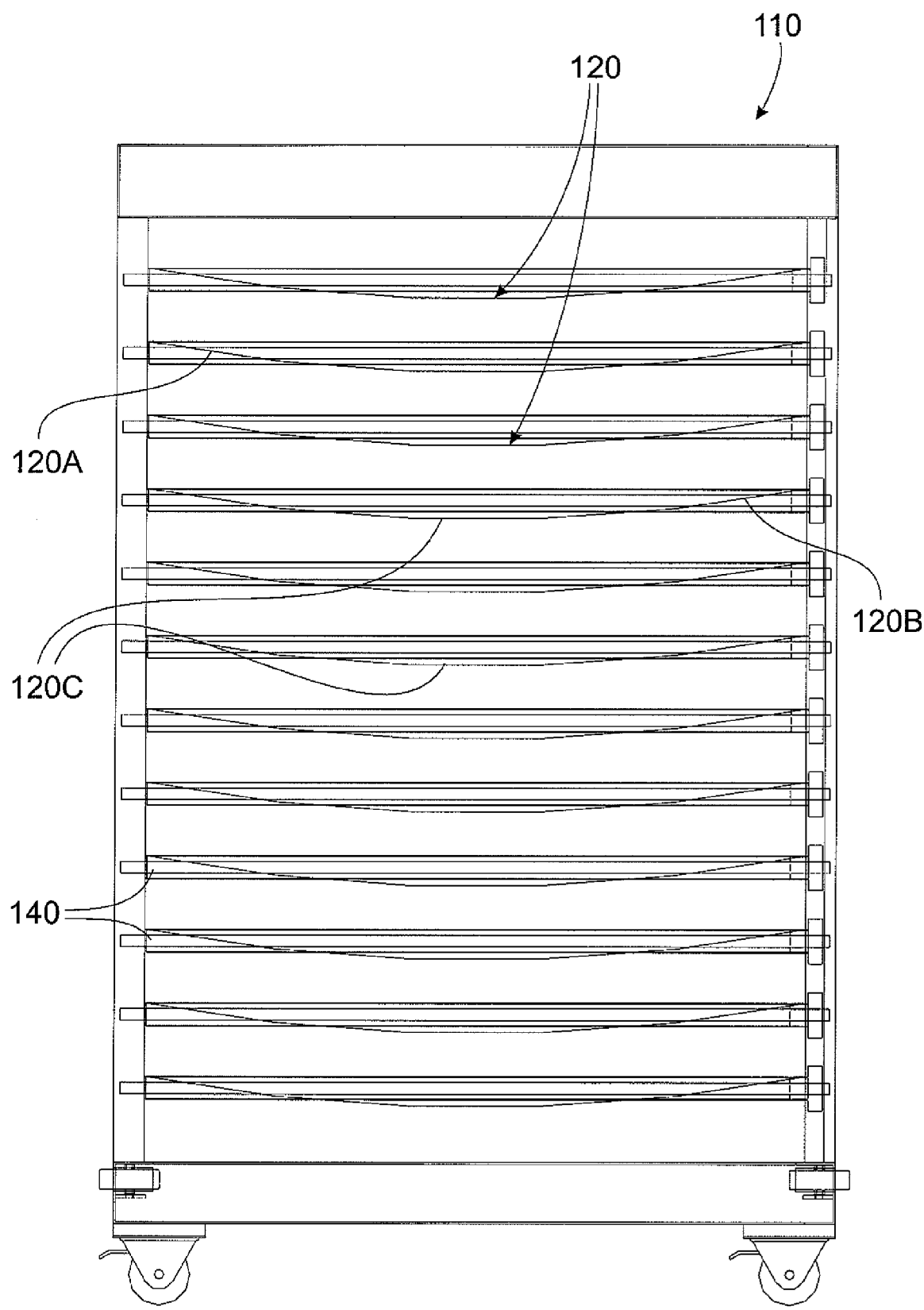
FIG. 8 is a schematic front elevational view of a second embodiment of the egg transport module.

In the second embodiment of the module 110 illustrated in FIG. 8, the shelves 120 are fixed and are substantially horizontal (in side view) from the loading end to the unloading end. However, in end elevational view, the shelves 120 are of a modified "V-shape", with inclined side walls 120A, 120B connected to a central valley floor 120C. The eggs pass over the head roller 140, and then gravitate towards the central valley floor 120C for transport. They will download in reverse.

This module 110 provides an extremely cost effective and simple, lighter weight alternative to the module 10 of the first embodiment.

Figure 6:
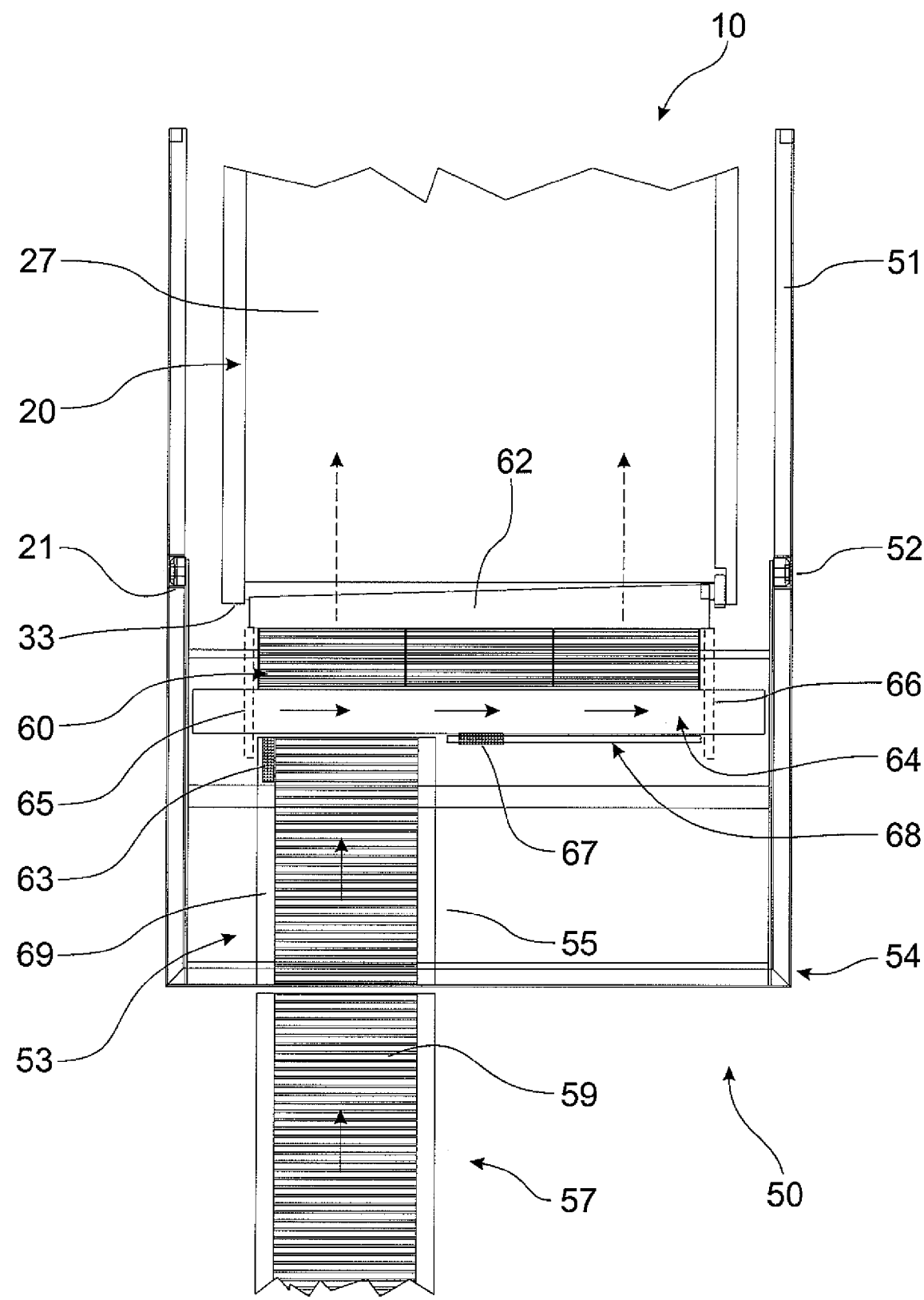
FIG. 6 is a schematic top plan view of the egg loader.

Referring to FIGS. 1 and 6, the egg loader 50 of the first embodiment has a docking station 51 with an external frame having two vertical posts 52, higher than the transport modules 10, connected to the floor and braced by braces 53 adjacent the transport module 10.

The egg loader 50 has a loading head 54 which moves up and down the posts 52 to access different shelves 20 of the transport module 10 received at the docking station 51.

The loading head 54 having an accumulating conveyor 55 is mounted on a horizontal support frame 56 on the loading head 54 and receives eggs from an extendible packing shed table conveyor 57, which is hingedly connected to the packing table 58. Transverse cleats 59 on the table conveyor 57 assist retaining the eggs on the inclined top run of the table conveyor 57.

As shown in FIG. 6, a (barrel) egg roller 60 extends across the loading head 54 and has a gear 61 which indirectly engages the driving gear 26 of an adjacent shelf 20 of the transport module 10.

A tapered, flexible plastics, bridge 62 spans the space between the egg roller 60 and the loading end 33 of the shelf 20

A (substantially horizontal) transfer belt conveyor 64 is provided between the accumulating conveyor 55 and the egg roller 60 and passes under respective end plates 65, 66.

A first egg sensor 67 is provided on a side wall 68 for the transfer conveyor 64; while a second egg sensor is provided on a side wall 69 of the accumulating conveyor 55 adjacent the transfer conveyor 64.

In use, the loading head 54 is raised or lowered and automatically aligned (by proximity sensor) with the egg roller 60 on the shelf 20 of the transport module to be filled and the bridge 62 engages the loading end 33 of the shelf 20.

Eggs are conveyed up the table conveyor 57 and along the accumulating conveyor 55 to a transfer conveyor 64, which operates in the direction of the arrows in FIG. 6. The eggs are moved relative to the egg roller 60 and accumulate (to the left) of the end plate 66.

When the first egg sensor 67 detects an accumulation of eggs, it shuts off the transfer conveyor 64 and the accumulating conveyor 55 fills the space to the end plate 65. When the space is filled, it is sensed by the second egg sensor 68 which operates the egg roller 60 to rotate and transfer a batch of eggs via the bridge 62 to the shelf 20.

The accumulating conveyor 55 continues to operate and the first sensor 67 restarts the transfer conveyor 64 so that the loading cycle can be repeated until the shelf 20 is fully loaded.

The bridge 62 is tapered in width between each end. As the loading head 54 lowers to the next shelf 20, the tapered bridge 62 is caused to flex and slowly release from the shelf 20 at its narrowest end first and gradually release towards its widest end before the loading head 54 reaches the next shelf 20. This effectively lowers the eggs, that are still on the bridge 62, gently to the next level.

Figure 7:
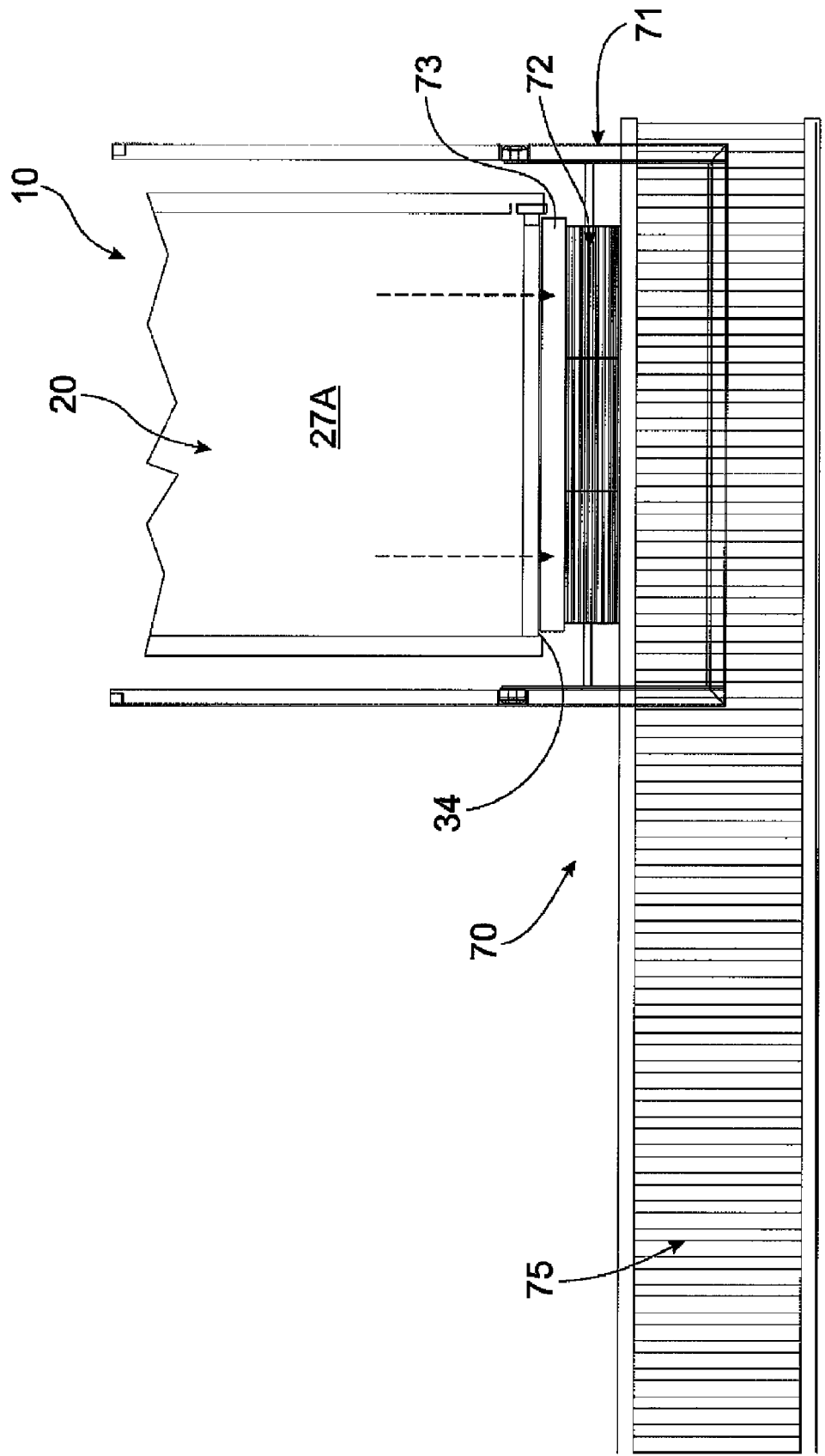
FIG. 7 is a schematic top plan view of the egg unloader.

Referring to FIG. 7, the unloader 70 has a similar docking station 71, where a (barrel) egg roller 72 and bridge 73 can be raised or lowered into selective alignment (via a proximity sensor) with the unloading end 34 of a shelf 20 of the transport module 10. When the egg roller 72 is driven in unison with the top view 27A of the belt on the shelf 20, the eggs are transferred via the bridge 73 and the egg roller 74 to a packing shed conveyor 75 for downstream handling.

The bridge 73 on the unloader 70 is different to the bridge 62. It is a rigid, non tapered design and does not rest on the shelf 20 whilst unloading. It is positioned forward of and slightly lower than the shelf roller 41 to provide a clearance (eg., 5 mm) to allow unloader 70 to move without touching the shelves 20. Eggs pass readily over the small gap.

Figure 9:
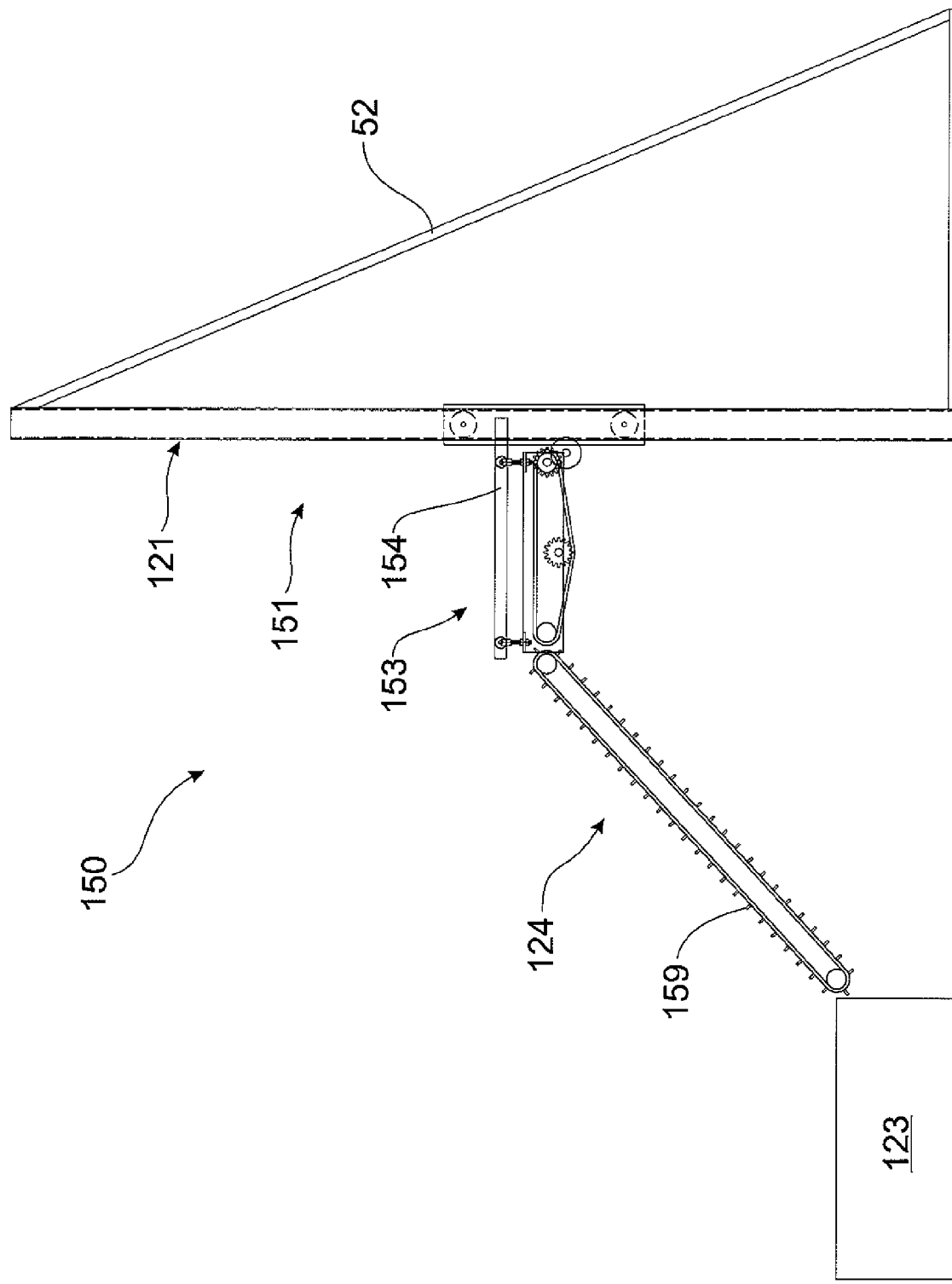
FIG. 9 is a schematic side view of a second embodiment of the egg loader.
Figure 10:
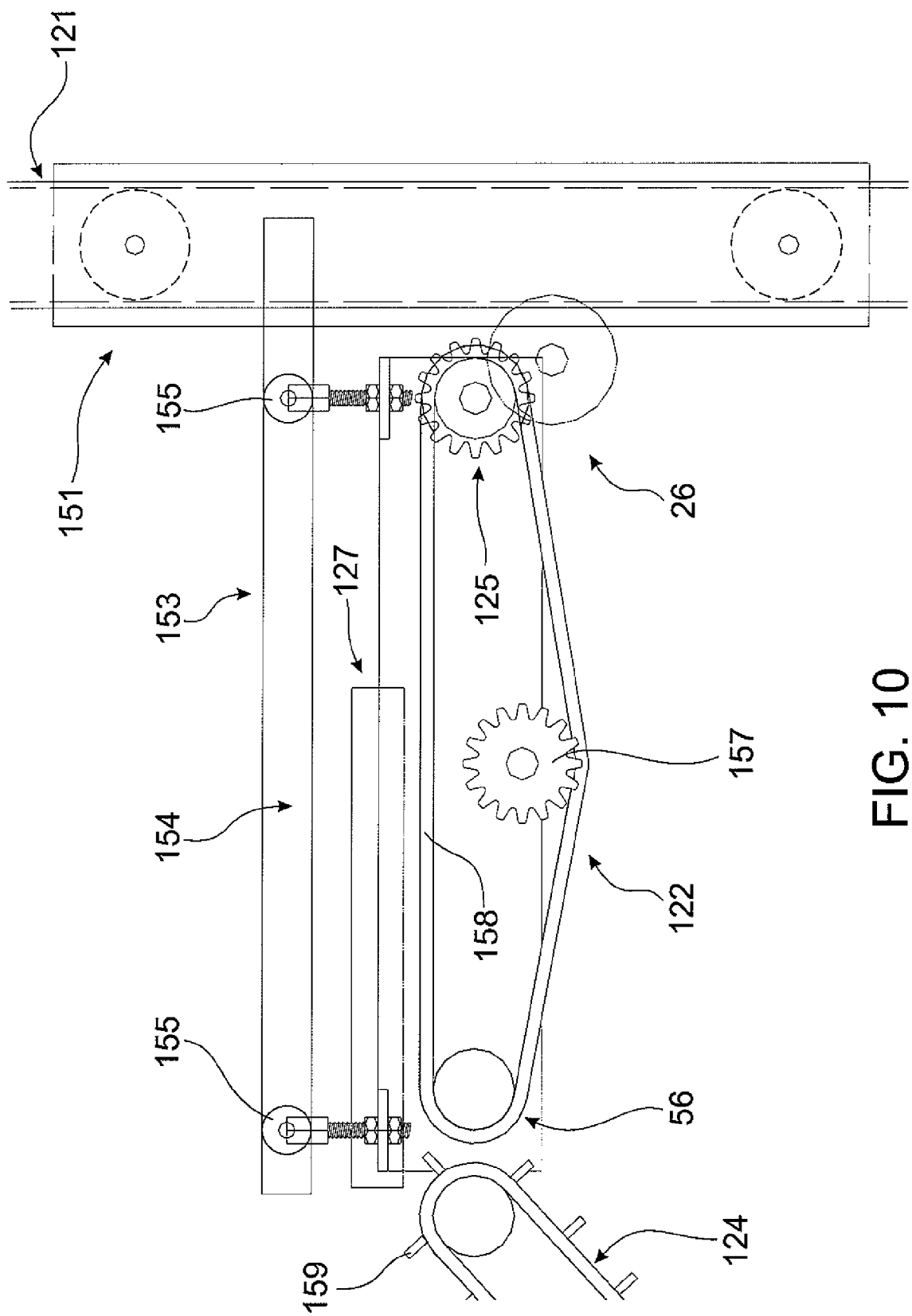
FIG. 10 is a similar view, on an enlarged scale, of the platform conveyor of the egg loader.
Figure 11:
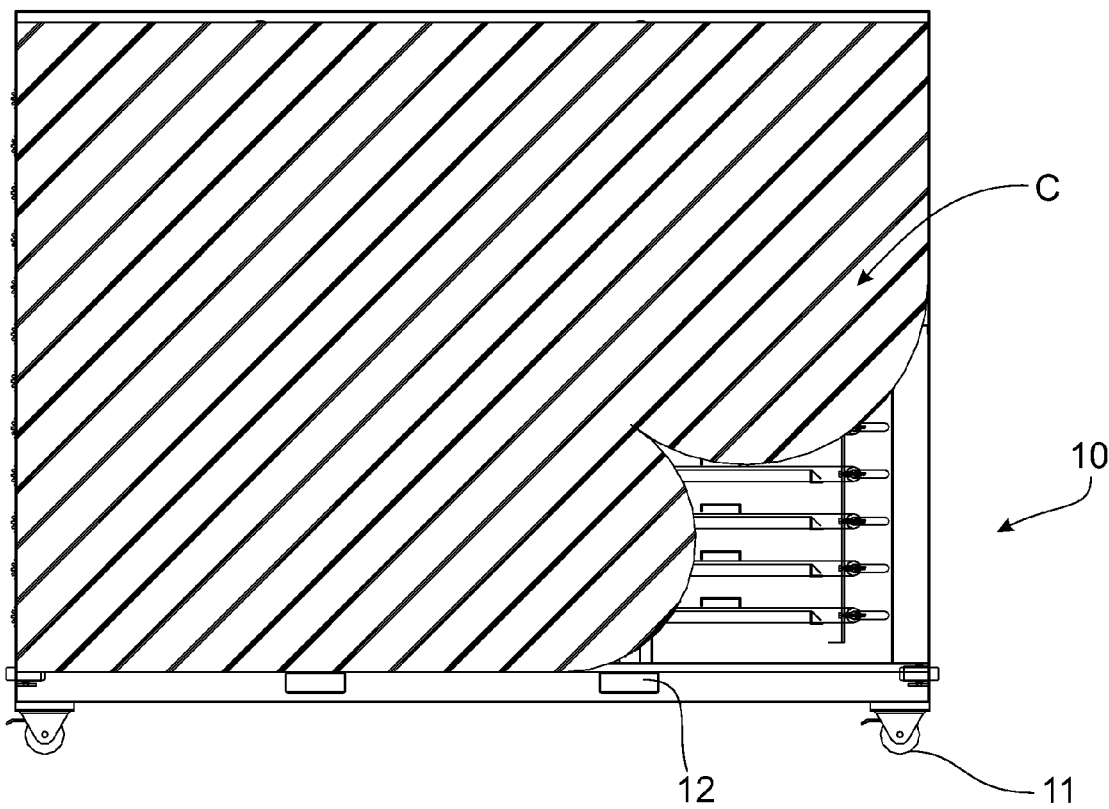
FIG. 11 is a plan view, partially broken away, showing the transport module with a curtain.

Referring to FIGS. 9 and 10, the egg loader of a second embodiment 150 has a docking station 151 comprising an external frame 121 of two upright posts, higher than the transport modules 10, connected across the top, mounted to the floor and braced diagonally by diagonal braces 152 back to the floor beside the positioned transport module 10.

The docking station 151 has a loading head 153 which moves vertically up and down the external frame 121 to access different shelves 20 on a transport module 10 received at the docking station 151.

The loading head 153 has a platform conveyor 122 of width equal to the width of the transport module 10.

The platform conveyor 122 is mounted on a horizontal support frame 154 (having a pair of inverted channel section arms 155) on the loading head 153, by pairs of rollers 155 which enable the platform conveyor 122 to be advanced towards the transport module 10 when eggs are being supplied to a shelf 20 of the transport module 10; or to be retracted, eg., 70 mm, when the loading head 151 is moved vertically to enable the platform conveyor 122 to be brought into alignment with another of the shelves 20 of the transport module 10.

The platform conveyor 122 may be moved relative to the horizontal support frame 154, and thereby the shelves 20 of the transport modules, by an actuator (not shown) interconnecting the platform conveyor 122 to the horizontal support frame 154.

A suitable drive motor (not shown) on the frame 56 of the platform conveyor 122 selectively drives a gear 157 which advances the top run 158 of the platform conveyor 122 to advance the eggs to the adjacent shelves 20 of the transport module 10. A driving gear 125 on the platform conveyor 122 engages the adjacent gear 26 on the aligned shelf 20 to enable the platform conveyor 122 to drive the mat 27 of the aligned shelf 20 in unison, to advance the eggs up the inclined shelf 20. Pinch rollers 126 on the platform conveyor 122 pinch the mat 27 to its respective head rollers 40 to ensure positive drive of the mat 27 by the head roller 40. (Preferably, the pinch rollers 126 are also driven at an indexed speed to the driving gear 125, to match the speed of the adjacent head rollers 40 and mats 27.)

The eggs are supplied to the platform conveyor 122 from a packing shed table egg conveyor 123, via connecting conveyor 124, which is hingedly mounted between the packing table 123 and the front edge of the platform conveyor 122.

Connecting conveyor 124 is extendible telescopically to facilitate the vertical movement of the loading head 151 to different levels up the external frame 121, enabling the platform conveyor 122 to be brought into alignment with selected shelves 20 of the transport module 10 in the docking station 151. Preferably, the connecting conveyor 124 has a plurality of transverse rods or bars 159 which ensure that the eggs will not roll down the inclined top run of the connecting conveyor 124.

A convergent chute 127 is pivotally mounted on the frame 156 of the platform conveyor 122, and is provided with an actuator (not shown) to cause the convergent, downstream end, of the chute 127 to be swept transversely across the top run 158 of the platform conveyor 122 so that eggs are distributed across the full width of the top run 158 of the platform conveyor 122 and thereby across the full width of the adjacent shelf 20 of the transport module 10. The convergent chute 127 may be raised to sweep transversely to the top run 158 of the platform conveyor 122 by a mechanical cam device (not shown) driven by drive gear 157.

A connecting bridge (not shown) transfers the eggs from the platform conveyor 122 to the adjacent egg entry end 133 of the shelf 20 in the transport module 10. It bridges the gap formed by the radius of the two opposing rollers 26, 40; and when the loading head 153 is withdrawn, a small actuator (not shown) tilts the connecting bridge upwards to retain the eggs still on the platform conveyor 122 until the loading head 153 is brought into alignment with the next shelf 20 on the transport module 10 and the platform conveyor 122 is advanced to engage the driving roller 125 with the driven roller 26 of that shelf 20.

In an embodiment where the platform conveyor 122 is advanced/retracted by an actuator, the bridge connection may be tilted by a mechanical connection to the platform conveyor 122.

The construction of the egg unloader of a second embodiment is substantially identical to that as hereinbefore described for the egg loader 150, except that the chute 127 is omitted from the platform conveyor 122.

All functions of the system can be controlled by a suitable programmable logic controller, eg., personal computer; and micro-switches can provide the necessary sensors to ensure, eg., accurate alignment of the loading head 153 of the egg loader/unloading head of the egg unloader with the respective shelves 20 of the transport module 10 when engaged in the docking station 151 of the egg loader or egg unloader.

With this system in operation, eggs are fed directly from the shed conveyor 123 onto the extendible connecting conveyor 124, and sensor paddles (not shown) will temporarily stop the shed conveyor 123 if overload is sensed at this point. Eggs continue to the chute 127 on the platform conveyor 122, where the chute 127 also has overload sensing paddles at each side, to halt the in-flow of eggs when necessary.

The eggs in the chute 127 are resting on the top run 158 of the platform conveyor 122, where they are moved towards the egg entry end 133 of the aligned shelf 20 of the transport module 10. Positioned on the sides of the platform conveyor 122, near the entrance, are also sensor paddles. When both of these paddles are activated, indicating eggs are full across the face of the shelf, due to the action of the chute 127, then the driving gear 125 will operate the driven gear 26 to drive the mat 27 of the shelf 20 a small distance to allow further eggs to feed onto the shelf 20. This process continues until the shelf 20 is filled to the back of the transport module 10. A sensor will indicate this and all the conveyors will stop. The platform conveyor 122 will be retracted, the loading head 153 will move to alignment with another shelf 20 in the transport module 10, to start a new cycle.

When all the shelves 20 of the transport module 10 have been filled, or a time desired for effective system management, eg., at the end of the laying period, the transport module 10 is disconnected from the docking station 151 of the egg loader 150 and the transport module 10 can be moved to the packing area for downloading at the end of the day. The eggs are removed from the shelves 20 of the transport module by the egg unloader, in a reverse operation.

Depending on the distance between the shed conveyor and the packing and/or grading station, the transport module 10 may be wheeled on its wheels 11; may be transported via a forklift or other materials handling vehicle, or may be mounted in/on a vehicle, e.g., a refrigerated van for transport between the two locations.

While eggs are received within the transport module 10, the refrigeration unit R, blowing cool air over the eggs, ensures that the eggs are maintained within a desired temperature range.

Advantages of the system include:
1) eggs are constantly removed from the shed throughout the day and placed into the transport module to allow flexible collection of the eggs from the nesting boxes;
2) the transport modules are refrigerated, so that once in the transport module, the eggs are safely stored under controlled climatic conditions until such time as they can be downloaded, which best suits farm management processes (typically, farm staff are busiest during mornings when most eggs are being laid—with the eggs simply accumulating in the transport module, they are protected until quieter periods of the day when they can be downloaded);
3) the transport modules are easily transported by various methods such as forklifts, trailers, trucks with tailgate loaders, pallet jacks or manual pushing (depending on distance and farm lay-outs);
4) the size of the transport modules is designed around standard trucking dimensions;
5) the distance from the laying sheds to the farm packer is of no real importance;
6) multiple farms may even share a farm packer at a central packing station;
7) the modules are fitted with anti-vibration cushioning devices for transport;
8) for transporting, the shelves are oriented to the transport mode, which nests the eggs together, thus minimising cracking;
9) the transport modules are automatically downloaded to the farm packer with minimum labour; and
10) the egg laying collection within the sheds continues while the transport modules are away being unloaded.

When combined with the automatic collection system for the eggs in the sheds, the transport modules, and the overall system hereinbefore described, enables extremely efficient, safe handling of the loose eggs with minimum manual labour input.

Various changes and modifications may be made to the embodiments described and illustrated without departing from the present invention.

The invention claimed is:

1. An egg transport module including:
a main frame, the main frame being rectangular in plan view, having a base frame with four posts at or adjacent respective corners which support a top frame, the base frame being supported on wheels and incorporating slots to receive the forks of forklifts or other materials handling vehicles;
a plurality of vertically-spaced shelves supported by the main frame, each shelf having an egg entry end;
a respective movable belt or mat on each shelf, operable to move the eggs to and/or from the egg entry end to at least one storage zone on the shelf; and
respective drive means to operably move each belt or mat, each of said drive means being operable to receive power from a loader or unloader, structured for cooperative engagement,
wherein each shelf is upwardly inclined, at less than 10°, from the egg entry end, to prevent eggs rolling ahead and cracking during filling; and is provided with stop means at a distal end thereof.

2. A module as claimed in claim 1, wherein:
at least one vertically aligned set of the base support channels are mounted on a pair of post slides, slidably mounted on intermediate post interconnecting the base frame and the top frame, to enable the shelves to be selectively moved to form at least one substantially shallow V-shape storage zone, to nest the eggs together when the module is being transported.

3. A module as claimed in claim 1, wherein:
each shelf has a single panel of modified V-section in end view.

4. A module as claimed in claim 3, wherein:
each band or mat is perforated to allow air flow through to the eggs and to allow drainage if a broken egg occurs, and the band or mat may be manufactured from rubber and/or plastic sheet, or metal or plastics rods or mesh.

5. A module as claimed in claim 4, wherein:
the head roller is operably connected to a driven gear which is engaged by a driving gear on an egg loader, when eggs are being transferred to the shelf.

6. A module as claimed in claim 1, wherein:
the module is provided with side and end thermally-insulated curtains, doors and/or walls; and a refrigeration unit provides cooling air to maintain the eggs within a preferred temperature range while stored on the transport modules.

* * * * *